(12) United States Patent
Li et al.

(10) Patent No.: US 11,597,852 B2
(45) Date of Patent: Mar. 7, 2023

(54) CLAY-POLYACRYLATE COMPOSITES SUSPENSION VIA IN SITU POLYMERIZATION

(71) Applicant: Agency for Science, Technology and Research, Singapore (SG)

(72) Inventors: Xu Li, Singapore (SG); Yu Zhang, Singapore (SG); Ming Yan Tan, Singapore (SG); Siew Yee Wong, Singapore (SG); Xi Kui Zhang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 560 days.

(21) Appl. No.: 16/493,555

(22) PCT Filed: Mar. 14, 2018

(86) PCT No.: PCT/SG2018/050115
§ 371 (c)(1),
(2) Date: Sep. 12, 2019

(87) PCT Pub. No.: WO2018/169490
PCT Pub. Date: Sep. 20, 2018

(65) Prior Publication Data
US 2020/0002453 A1 Jan. 2, 2020

(30) Foreign Application Priority Data
Mar. 14, 2017 (SG) .............................. 10201702064P (51) Int. Cl.
| | | |
|---|---|---|
| *C09D 133/14* | (2006.01) | |
| *C08F 292/00* | (2006.01) | |
| *C08F 2/44* | (2006.01) | |
| *C08F 2/18* | (2006.01) | |
| *C08K 5/14* | (2006.01) | |
| *C08K 5/5425* | (2006.01) | |
| *C08K 9/04* | (2006.01) | |
| *C08K 3/34* | (2006.01) | |
| *C08F 220/18* | (2006.01) | |

(52) U.S. Cl.
CPC .............. *C09D 133/14* (2013.01); *C08F 2/18* (2013.01); *C08F 2/44* (2013.01); *C08F 220/1808* (2020.02); *C08F 292/00* (2013.01); *C08K 3/346* (2013.01); *C08K 5/14* (2013.01); *C08K 5/5425* (2013.01); *C08K 9/04* (2013.01); *C08F 220/1806* (2020.02)

(58) Field of Classification Search
CPC .............. C09D 133/14; C08F 220/1808; C08F 220/1806; C08F 2/18; C08F 2/44; C08F 292/00; C08K 3/346; C08K 5/14; C08K 5/5425; C08K 9/04
USPC ....................................................... 524/445
See application file for complete search history.

(56) References Cited

U.S. PATENT DOCUMENTS

| | | |
|---|---|---|
| 5,880,197 A | 3/1999 | Beall et al. |
| 6,610,780 B1 | 8/2003 | Payzant et al. |
| 6,730,719 B2 | 5/2004 | Powell |
| 2004/0110884 A1 | 6/2004 | Dontula et al. |

FOREIGN PATENT DOCUMENTS

| | | | |
|---|---|---|---|
| CN | 102206395 A | | 10/2011 |
| CN | 103242490 A | * | 8/2013 |
| CN | 103242490 A | | 8/2013 |
| CN | 103951782 A | * | 7/2014 |
| CN | 103951782 A | | 7/2014 |
| CN | 104877554 A | | 9/2015 |
| WO | 0224756 A2 | | 3/2002 |
| WO | 2015178856 A1 | | 11/2015 |

OTHER PUBLICATIONS

International Search Report for International Application No. PCT/SG2018/050115 dated Jun. 4, 2018, pp. 1-6.
Written Opinion of the International Searching Authority for International Application No. PCT/SG2018/050115 dated Jun. 4, 2018, pp. 1-6.
Xu et al., "Preparation of Polyacrylate-Clay Nanocomposites by In-Situ Polymerizatoin and Heterocoagulation," Journal of Applied Polymer Science, vol. 101, 2006, pp. 3850-3855.
Datta et al., "Tailor-Made Hybrid Nanostructure of Poly(ethyl acrylate)/Clay by Surface-Initiated Atom Transfer Radical Polymerization," Journal of Polymer Science: Part A: Polymer Chemistry, vol. 46, 2008, pp. 5014-5027.
Herrera et al., "Aqueous Dispersions of Silane-Functionalized Laponite Clay Platelets. A First Step Toward the Elaboration of Water-Based Polymer/Clay Nanocomposites," Langmuir, vol. 20, 2004, pp. 1564-1571.
International Preliminary Report on Patentability for International Application No. PCT/SG2018/050115 dated Mar. 22, 2019, pp. 1-24.

\* cited by examiner

*Primary Examiner* — Kelechi C Egwim
(74) *Attorney, Agent, or Firm* — Shackelford, Bowen, McKinley & Norton, LLP (57) ABSTRACT

The present disclosure relates to a clay-polyacrylate composite comprising layers of clay intercalated with polyacrylate, wherein the layers of clay comprises at least one organosilane coupling agent comprising an acrylate moiety; and wherein the polyacrylate comprises a first acrylate monomer and a second acrylate monomer having different solubility. A surfactant-free method of synthesizing the said clay-polyacrylate composite and a method for coating are also provided. In a preferred embodiment, the first acrylate monomer is a hydrophilic acrylate monomer, e.g. 2-hydroxyethyl acrylate, and the second acrylate monomer is a hydrophobic acrylate monomer, e.g. 2-ethylhexyl acrylate. The clay-acrylate composite can be used for forming a barrier coating, which exhibits low water and low oxygen permeability.

7 Claims, 3 Drawing Sheets

CLAY-POLYACRYLATE COMPOSITES SUSPENSION VIA IN SITU POLYMERIZATION

CROSS-REFERENCE TO RELATED APPLICATION

This application claims the benefit of priority of Singapore Patent Application No. 10201702064P, filed 14 Mar. 2017, the content of it being hereby incorporated by reference in its entirety for all purposes.

TECHNICAL FIELD

The present disclosure relates to a clay-polyacrylate composite and a method of synthesizing such clay-polyacrylate composite. The present disclosure also relates to a method of synthesizing a polymeric clay composition.

BACKGROUND

Nanoclays have been used as inorganic fillers to reinforce polymer composites and enhance their processability. However, nanoclays conventionally have weak bonding and poor compatibility with the polymers. Surfactant treated clays were developed as one of the means to improve compatibility with the polymers but the issue of weak bonding is often not adequately addressed. In addition, the resultant surfactant treated clay polymer composite suffers from poor mechanical strength. Silane treated clays were also developed but such clays suffer from very poor dispersion in aqueous medium and thus requires the use of organic solvents for forming a clay polymer composite. Several other methods of producing polymeric clay composites have been explored. Such methods, however, tend to have their limitations. Some of these methods, and their limitations, which have been reported, are described below.

In one method of producing clay/polymer suspension via in situ suspension polymerization, the clay sheets are modified with organic surfactant through ionic bonding to enhance its miscibility with monomers. The monomers then become intercalated between modified clay sheets, which may be initiated to produce polymers between the clay sheets. The interfacial bonding between the clay sheets and polymers, however, is hydrophobic in nature, which renders the bonding between the clay sheets and polymers weak.

In another report, a process for preparation of exfoliated clay/polymer composite through formation of a networked polymer in the presence of clay sheets is provided. Monomers, crosslinking agents and clay were mixed to form a uniform dispersed suspension. Polymerization was then initiated to produce a networked clay/polymer composite to maintain the exfoliation of clay sheets. However, this process produces weak interfacial bonding between the clay sheets and polymers, and the resultant composite was not capable of further processing for coating and packaging applications.

In another report, a method of making intercalated clay/polymer composite is provided. The intercalation was achieved by using an intercalant amine and/or amide monomer to sorb or intercalate monomers between adjacent clay sheets to expand the adjacent clay sheets so as to create enough space for polymerization. The interfacial bonding between clay sheet and polymer resulting from such a method is weaker and such an approach tends to be limited to monomers with special structure that sorbs onto the clay sheets.

In another report, a method to intercalate clay with a block copolymer is disclosed. The block copolymer comprises a hydrophilic block capable of intercalating clay. Consequently, the interfacial bonding between the clay sheets and polymer is hydrophilic and not covalent in nature, which renders the bonding between the clay sheets and polymers weak. Moreover, the method tends to be limited to specifically designed block copolymers as reported.

In a further report, an approach to enhance the intercalation of clay is disclosed, wherein the clay is intercalated by using quaternary ammonium ions, through edge treating with negatively charged organic molecules or anionic polymer prior to exfoliation. This approach was taught to be specifically applicable for intercalating clay into a cationic polymer matrix.

In light of reported methods as discussed above, there is thus a need to provide for a solution that ameliorates one or more of the limitations as mentioned above. The approach should at least be able to intercalate acrylate monomers between clay sheets without using any surfactant. The acrylate monomers should at least be polymerizable to form polyacrylates that are covalently bonded to the clay sheets. The clay polymeric composite derived from such a solution should at least be applicable for use in paint, coating, adhesive and packaging applications.

SUMMARY

In one aspect, there is provided for a clay-polyacrylate composite comprising:

one or more layers of clay intercalated with polyacrylate;

wherein the one or more layers of clay comprises at least one organosilane coupling agent comprising an acrylate moiety;

wherein the at least one organosilane coupling agent is attached to a surface of the one or more layers of clay and the polyacrylate is covalently attached to the organosilane coupling agent; and wherein the polyacrylate comprises a first acrylate monomer and a second acrylate monomer having different solubility.

In another aspect, there is provided for a method of synthesizing a clay-polyacrylate composite comprising the steps of:

a) mixing an aqueous solution comprising clay with at least one organosilane coupling agent comprising an acrylate moiety to form a silanized-clay suspension;

b) contacting the silanized-clay suspension with a first acrylate monomer and a second acrylate monomer in an inert environment, wherein the first acrylate monomer and the second acrylate monomer have different solubility; and c) adding a polymerization initiator to the silanized-clay suspension before or during step (b) in the inert environment to form the clay-polyacrylate composite comprising the first and second acrylate monomer.

In another aspect, there is provided for a method of synthesizing a polymeric clay composition for coating, comprising the steps of:

(i) producing a clay-polyacrylate composite as described above; and (ii) mixing the clay-polyacrylate composite with a solution comprising a polymer to form the polymeric clay composition, wherein the polymer is miscible with the polyacrylate of the clay-polyacrylate composite.

BRIEF DESCRIPTION OF THE DRAWINGS

The drawings are not necessarily to scale, emphasis instead generally being placed upon illustrating the principles of the invention. In the following description, various embodiments of the present disclosure are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and changes may be made without departing from the scope of the invention. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure provides for a clay-polyacrylate composite and method of synthesizing such clay-polyacrylate composite. Uses of the clay-polyacrylate composite are also discussed.

The clay-polyacrylate composite may be an intercalated clay-polyacrylate composite that does not involve any surfactant or organic solvent. In this regard, the surfactant refers to materials for intercalating clays, which may include onium species such as ammonium (primary, secondary, tertiary, and quaternary), phosphonium, or sulfonium derivatives of aliphatic and/or aromatic amines, phosphines and sulfides. These surfactants may undergo ion exchange with the metal cations present in the clay sheets and lipophilize the clay sheets, thereby reducing the surface polarity (e.g. hydrophilicity) of the clay sheets and enhancing the affinity between clay and polymer. With surfactants, interfacial interaction between clay sheets and polymer tends to be in the form of weak hydrophobic interaction, and the present clay-polyacrylate composite circumvents this.

The intercalated clay-polyacrylate composite may be in the form of a suspension, and the present method may be a facile method of making a clay-polyacrylate composite, for example, to be in its suspension form, which can be further formulated into a clay/polyvinylidene chloride composite barrier coating, which is one example of its application.

Advantageously, the present method involves in situ polymerization that circumvents the use of surfactants and organic solvents to intercalate polyacrylate into clay. In the present method, an organosilane coupling agent containing an acrylate group is attached to the surface of the clay. The acrylate group can then be polymerized to form polyacrylate such that the polyacrylate becomes intercalated in the clay. The polyacrylate is covalently bonded to the clay surface, which is advantageous as the covalent bonding allows for stronger interfacial bonding between the clay sheets and polyacrylate, as compared to weaker hydrophilic or hydrophobic interactions.

The present method is also versatile in that either or both hydrophilic and hydrophobic acrylate monomers can be used in the in situ polymerization to form the polyacrylate from the acrylate group of the organosilane coupling agent, in the presence of the clay. In other words, there is no restriction to the type of acrylate monomers that may be used to extend the acrylate group of the organosilane coupling agent into a polyacrylate. In this regard, the present method is advantageous as it allows the use and/or incorporation of hydrophobic acrylate monomers for intercalating polyacrylate in clay without the use of organic solvents. This also means that hydrophobic acrylate monomers can be used even if the polymerization were to be carried out in an aqueous medium. Accordingly, having monomers of different solubility in the formed polyacrylate, such as hydrophilic and hydrophobic acrylate monomeric units, provides versatility to the kind of polymer resin that the clay-polyacrylate can be mixed with.

The present method is also advantageous in that the clay surface may be modified using any organosilane, such as 3-(trimethoxysilyl)propyl methacrylate or other methacrylate-based organosilane coupling agents, to obtain a high bonding strength of the polyacrylate to the clay in the composite.

Embodiments described in the context of the present clay-polyacrylate composite are analogously valid for the present method and its uses as described herein, and vice versa.

Before going into the details of the various embodiments, the definitions of certain terms, expressions or phrases are first discussed.

In the context of the present disclosure, the term "clay" refers to a phyllosilicate of natural and/or synthetic origin having an appropriate structure for the intercalation of compounds. Such clay may have a layered or sheet structure.

In the context of the present disclosure, the term "intercalated" or its grammatical variant, refers to a layered material (e.g. clay) that has added spacing between its layers due to disposition of substances between the layers.

In the context of the present disclosure, the term "hydrophilic" refers to substances that form hydrogen bonds with water molecules. A hydrophilic substance tends to dissolve in an aqueous medium, such as water, to a greater extent, as compared to a hydrophobic substance.

In the context of the present disclosure, the term "hydrophobic" refers to substances that do not form hydrogen bond with water. A hydrophobic substance tends not to dissolve in an aqueous medium, such as water.

In the context of the present disclosure, the expression "water-repelling functional group" refers to the functional group of an organic compound that not only drives away water molecules but also does not form hydrogen bond with water molecules. Such "water-repelling functional group", at least, does not attract water molecules. Such "water-repelling functional group" is hydrophobic in nature.

In the context of the present disclosure, the term "organosilane" refers to a silane compound that contains at least one carbon to silicon bond.

The term "alkyl" as used herein, as a group or part of a group, refers to a straight or branched aliphatic hydrocarbon group, including but not limited to, a $C_1$-$C_{12}$ alkyl, a $C_1$-$C_{10}$ alkyl, a $C_1$-$C_6$ alkyl. Examples of suitable straight and branched $C_1$-$C_6$ alkyl substituents include methyl, ethyl, n-propyl, 2-propyl, n-butyl, sec-butyl, t-butyl, hexyl, and the like. Alkyl groups may be substituted or unsubstituted.

The term "aryl" as used herein refers to divalent ("arylene") single, polynuclear, conjugated or fused residues of aromatic hydrocarbons having from 6 to 10 carbon atoms. Such groups include, for example, phenyl, biphenyl, naphthyl, phenanthrenyl, and the like. Aryl groups may be substituted or unsubstituted.

The word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

Having defined the various terms, expressions and phrases, the various embodiments are now described below.

In the present disclosure, there is provided for a clay-polyacrylate composite comprising: one or more layers of clay intercalated with polyacrylate, wherein the one or more layers of clay comprises at least one organosilane coupling agent comprising an acrylate moiety, wherein the at least one organosilane coupling agent is attached to a surface of the one or more layers of clay and the polyacrylate is covalently attached to the organosilane coupling agent, and wherein the polyacrylate comprises a first acrylate monomer and a second acrylate monomer having different solubility.

In the present disclosure, the one or more layers of clay may comprise any clay minerals that are naturally or synthetically produced. In various embodiments, each of the one or more layers of clay may be selected from the group consisting of montmorillonite, bentonite, laponite, kaolinite, saponite, vermiculite, nontronite, hectorite, beidellite, mica, and their mixtures thereof. These clay minerals have the advantages of low cost, ease of availability and processability. In some embodiments, the one or more layers of clay may comprise montmorillonite. Montmorillonite is environmentally friendly and has a plate-like structure suitable for intercalation.

In various embodiments, the one or more layers of clay may be present in an amount of 5 to 80 wt %, 5 to 70 wt %, 5 to 60 wt %, 5 to 50 wt %, 5 to 40 wt %, 5 to 30 wt %, 5 to 20 wt %, 5 to 10 wt %, 10 to 80 wt %, 10 to 70 wt %, 10 to 60 wt %, 10 to 50 wt %, 10 to 40 wt %, 10 to 30 wt %, 10 to 20 wt %, 20 to 80 wt %, 20 to 70 wt %, 20 to 60 wt %, 20 to 50 wt %, 20 to 40 wt %, 20 to 30 wt %, 30 to 80 wt %, 30 to 70 wt %, 30 to 60 wt %, 30 to 50 wt %, 30 to 40 wt %, 40 to 80 wt %, 40 to 70 wt %, 40 to 60 wt %, 40 to 50 wt %, 50 to 80 wt %, 50 to 70 wt %, 50 to 60 wt %, 60 to 80 wt %, 60 to 70 wt %, 70 to 80 wt %, etc., wherein the wt % may be based on the clay-polyacrylate composite. In some embodiments, the one or more layers of clay may be present in an amount of 20 to 50 wt %, wherein the wt % may be based on the clay-polyacrylate composite.

In various embodiments, each of the one or more layers of clay may comprise a plate-like structure. That is to say, each layer of the clay may be envisaged as a sheet of clay.

In various embodiments, the surface of the clay, in other words, each of the one or more layers of clay may have their surface functionalized with at least one organosilane coupling agent. In various embodiments, the at least one organosilane coupling agent comprising an acrylate moiety may be attached to a surface of the one or more layers of clay by a covalent bond.

The organosilane coupling agent may contain an acrylate moiety that may be formed into a polyacrylate. The acrylate moiety may be referred to as an acrylate functional group or acrylate group. The organosilane coupling agent may be referred to as an organosilane, a silane or silane coupling agent.

Advantageously, a clay having their surface modified with an organosilane provides for covalent bonding between the clay and the polyacrylate, where the polyacrylate may be intercalated in the clay. The covalent bonding is a stronger interfacial bonding over hydrophilic interactions, hydrophobic interactions and Van der Waals forces. The use of an organosilane also enhances the mixing between the clay and polyacrylate, e.g. dispersion of silane modified clay in acrylate monomers for polymerization or vice versa, and this helps to ensure the clay is uniformly intercalated with polyacrylate. The use of organosilane coupling agent further strengthens the bonding of a polyacrylate to the clay through crosslinking of the polyacrylate with clay silicate via the alkoxy reactive groups of the organosilane. A diagram is illustrated below, as a non-limiting example, to depict how the organosilane coupling agent may be attached or coupled to a surface of the clay layers.

$R_1$ = H or $CH_3$
$R_2$ = $OCH_3$, $OC_2H_5$, Cl
$R_3$ = $OCH_3$, $OC_2H_5$, Cl, $CH_3$
$R_4$ = $OCH_3$, $OC_2H_5$, Cl, $CH_3$
Organosilane Silanized-clay The above schematic illustration of the organosilane coupling agent attached or coupled to a surface of the clay layers depicts that the oxygen atom of the hydrolyzed organosilane coupling agent is attached to the clay by a covalent bond. The acrylate moiety attached to the organosilane coupling agent is also shown. The acrylate moiety acts as a reactive group that serves as a "comonomer" for initiation of the polymerization of acrylate monomers into polyacrylate. The term "comonomer" is used herein as the acrylate moiety may form part of the polyacrylate that intercalates in the clay.

In various embodiments, the at least one organosilane coupling agent may comprise or consist of an acrylate moiety comprises 3-(trimethoxysilyl)propyl methacrylate, 3-(triethoxysilyl)propyl methacrylate, 3-(trichlorosilyl)propyl methacrylate, 3-[dimethoxy(methyl)silyl]propyl methacrylate, 3-[diethoxy(methyl)silyl]propyl methacrylate, 3-[dichloro(methyl)silyl]propyl methacrylate, 3-[methoxy(dimethyl)silyl]propyl methacrylate, 3-[ethoxy(dimethyl)silyl]propyl methacrylate, 3-[chloro(dimethyl)silyl]propyl methacrylate, 3-(trimethoxysilyl)propyl acrylate, 3-(dimethoxymethylsilyl)propyl acrylate, and/or their mixtures thereof. In some embodiments, the at least one organosilane coupling agent may comprise or consist of 3-(trimethoxysilyl)propyl methacrylate (TMSPM), which is illustrated below. TMSPM has a high affinity to surface of the clay layers.

3-(Trimethoxysilyl)Propyl Methacrylate (TMSPM)

In various embodiments, the at least one organosilane coupling agent comprising an acrylate moiety may be present in an amount of 1 to 40 wt %, 5 to 40 wt %, 10 to 40 wt %, 20 to 40 wt %, 30 to 40 wt %, 1 to 30 wt %, 5 to 30 wt %, 10 to 30 wt %, 20 to 30 wt %, 1 to 20 wt %, 5 to 20 wt %, 10 to 20 wt %, 1 to 10 wt %, 5 to 10 wt %, 1 to 5 wt %, etc., wherein the wt % may be based on weight of clay. In some embodiments, the at least one organosilane coupling agent comprising an acrylate moiety may be present in an amount of 5 to 10 wt %, and wherein the wt % may be based on weight of clay. Organosilane of these ranges, including the 5 to 10 wt % range, ensures an amount of alkoxy reactive groups for forming sufficient polyacrylates crosslinked to the clay layers, which strengthens interfacial bonding between the clay layers and polyacrylate, and between the clay-polyacrylate composite and a polymer resin.

Figure 2:
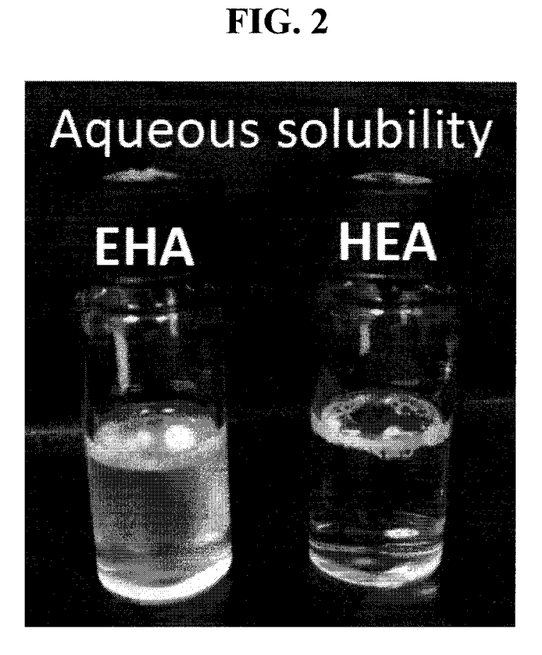
FIG. 2 compares the aqueous solubility of 2-ethylhexyl acrylate (EHA) and 2-hydroxyethyl acrylate (HEA) monomers in an aqueous medium.

In various embodiments, the polyacrylate may be a random copolymer. This means that the monomers forming the polyacrylate may not be in any form of statistical arrangement. As mentioned above, the polyacrylate may comprise or form from a first acrylate monomer and a second acrylate monomer. The first and second acrylate monomers differ in their solubility, for example, in an aqueous medium, such as but not limited to, water. In such instances, the solubility may be referred to herein as the aqueous solubility. A comparison of the aqueous solubility of EHA and HEA is illustrated in FIG. 2. The advantages of using acrylate monomers of different solubility is described below, by way of a non-limiting example, from the acrylate monomers used.

In various embodiments, the first acrylate monomer may be a hydrophilic acrylate monomer. The hydrophilic acrylate monomer may comprise a hydroxyl (—OH) group. The hydrophilic acrylate monomer may comprise or consist of 2-hydroxyethyl acrylate (HEA), 2-hydroxyethyl methylacrylate (HEMA), hydroxypropyl acrylate (HPA) or 4-hydroxybutyl acrylate (HBA). In some embodiments, the hydrophilic acrylate monomer may be 2-hydroxyethyl acrylate (HEA), as shown below.

2-Hydroxyethyl Acrylate (HEA)

Advantageously, a hydrophilic acrylate monomer, being a more soluble acrylate monomer, aids in the compatibility with the surface chemistry of a clay modified with the at least one organosilane for formation of a polyacrylate. It also helps to facilitate, for example, more effective PHEA/clay bonding in cases where the polyacrylate is formed from HEA monomers. It further improves clay exfoliation (i.e. separation of the clay layers) and mixing with the polymers of a resin. The hydrophilic acrylate monomer, being a more soluble acrylate monomer, also improves usage compatibility of hydrophobic acrylate monomers. This allows for hydrophobic acrylate monomers, which are relatively less soluble monomers, to be incorporated into the polyacrylate, by stabilizing the hydrophobic acrylate monomers (an example of less soluble acrylate monomers), for instance, in an aqueous suspension, and facilitating the binding of the hydrophobic acrylate monomers to the clay sheets.

The use of a first and a second acrylate monomers having different solubility eliminates the restriction of having to solely use a specific acrylate monomer. For example, the use of a first and a second acrylate monomers having different solubility stabilizes the acrylate monomer with poorer solubility in an aqueous suspension, thereby improving polymerization rate when forming a polyacrylate from such monomers of different solubility in an aqueous environment.

In various embodiments, the second acrylate monomer may be a hydrophobic acrylate monomer. The hydrophobic acrylate monomer may comprise a water-repelling functional group. The water-repelling functional group may include hydrocarbon, such as alkyl, aryl, acetate, etc. The hydrophobic acrylate monomer may comprise ethyl acrylate (EA), butyl acrylate (BA), hexyl acrylate (HA), 2-ethylhexyl acrylate (EHA), octyl acrylate (OA), decyl acrylate (DA), lauryl acrylate (LA), octadecyl acrylate (ODA) or vinyl acetate (VA). In some embodiments, the hydrophobic acrylate monomer may be EHA as shown below.

2-Ethylhexyl Acrylate (EHA)

In various instances, the polyacrylate may comprise a random copolymer formed from monomers HEA and EHA. In some embodiments, the polyacrylate may comprise or consist of poly(hydroxyethyl acrylate-ran-ethylhexyl acrylate) (PHEA-PEHA).

In various embodiments, the hydrophilic acrylate monomer may be present in the polyacrylate in an amount of 10 to 90 wt %, 20 to 90 wt %, 30 to 90 wt %, 40 to 90 wt %, 50 to 90 wt %, 60 to 90 wt %, 70 to 90 wt %, 80 to 90 wt %, 10 to 80 wt %, 20 to 80 wt %, 30 to 80 wt %, 40 to 80 wt %, 50 to 80 wt %, 60 to 80 wt %, 70 to 80 wt %, 10 to 70 wt %, 20 to 70 wt %, 30 to 70 wt %, 40 to 70 wt %, 50 to 70 wt %, 60 to 70 wt %, 10 to 60 wt %, 20 to 60 wt %, 30 to 60 wt %, 40 to 60 wt %, 50 to 60 wt %, 10 to 50 wt %, 20 to 50 wt %, 30 to 50 wt %, 40 to 50 wt %, 10 to 40 wt %, 20 to 40 wt %, 30 to 40 wt %, 10 to 30 wt %, 20 to 30 wt %, 10 to 20 wt %, etc., and wherein the wt % may be based on weight of the polyacrylate. The amounts of hydrophilic acrylate monomers in these ranges are advantageous for tuning the clay-polyacrylate bonding and assisting in clay exfoliation and dispersion in polymers.

In various embodiments, the hydrophobic acrylate monomer may be present in the polyacrylate in an amount of 10 to 90 wt %, 20 to 90 wt %, 30 to 90 wt %, 40 to 90 wt %, 50 to 90 wt %, 60 to 90 wt %, 70 to 90 wt %, 80 to 90 wt %, 10 to 80 wt %, 20 to 80 wt %, 30 to 80 wt %, 40 to 80 wt %, 50 to 80 wt %, 60 to 80 wt %, 70 to 80 wt %, 10 to 70 wt %, 20 to 70 wt %, 30 to 70 wt %, 40 to 70 wt %, 50 to 70 wt %, 60 to 70 wt %, 10 to 60 wt %, 20 to 60 wt %, 30 to 60 wt %, 40 to 60 wt %, 50 to 60 wt %, 10 to 50 wt %, 20 to 50 wt %, 30 to 50 wt %, 40 to 50 wt %, 10 to 40 wt %, 20 to 40 wt %, 30 to 40 wt %, 10 to 30 wt %, 20 to 30 wt %, 10 to 20 wt %, etc., and wherein the wt % may be based on weight of the polyacrylate.

The present disclosure also provides for a method of synthesizing a clay-polyacrylate composite comprising the steps of: mixing an aqueous solution comprising clay with at least one organosilane coupling agent comprising an acrylate moiety to form a silanized-clay suspension, contacting the silanized-clay suspension with a first acrylate monomer and a second acrylate monomer in an inert environment, wherein the first acrylate monomer and the second acrylate monomer have different solubility, and adding a polymerization initiator to the silanized-clay suspension before or during the contacting step in the inert environment to form the clay-polyacrylate composite comprising the first and second acrylate monomer.

Various embodiments of the present clay-polyacrylate composite, and advantages associated with various embodiments of the present clay-polyacrylate composite, as described above, may be applicable to the present method, and vice versa.

In various embodiments, the aqueous solution may comprise or consist of water. Advantageously, the use of water not only allows for exfoliation of clay but also circumvents the need for organic mediums which may consist of harmful volatile organic compounds.

In various embodiments, the clay, as described above, may be selected from the group consisting of montmorillonite, bentonite, laponite, kaolinite, saponite, vermiculite, nontronite, hectorite, beidellite, mica, and their mixtures thereof. In some embodiments, the clay may be montmorillonite.

In various embodiments, the clay used in the method may be 1 to 10 wt %, 2 to 10 wt %, 3 to 10 wt %, 4 to 10 wt %, 5 to 10 wt %, 6 to 10 wt %, 7 to 10 wt %, 8 to 10 wt %, 9 to 10 wt %, etc., of the silanized-clay suspension. These ranges ensure good dispersion of clay in a polymer matrix, which allows for better interfacial bonding between the clay and polymer matrix.

In various embodiments, the method may further comprise a step of adding acetic acid to the aqueous solution comprising the clay before mixing with the at least one organosilane coupling agent to form an exfoliated clay suspension. The addition of acetic acid, even if added in a small volume, may help to promote exfoliation of the clay sheets, for example, in a suspension. This improves penetration of the at least one organosilane coupling agent, polymerization initiators and subsequent acrylate monomers.

In various embodiments, the exfoliated clay suspension may be hydrothermally treated to increase hydroxyl groups on the clay. This improves clay dispersion in water by modifying clay surface with more —OH groups. The exfoliated clay suspension may be hydrothermally treated at 100 to 200° C., 150 to 200° C., 100 to 150° C., etc. In some instances, the exfoliated clay suspension may be hydrothermally treated at 120° C. The exfoliated clay suspension may be hydrothermally treated for up to 1 hour, 2 hours, 3 hours, etc.

As described above, the at least one organosilane coupling agent used in the method may comprise an acrylate moiety comprises 3-(trimethoxysilyl)propyl methacrylate), 3-(triethoxysilyl)propyl methacrylate, 3-(trichlorosilyl)propyl methacrylate, 3-[dimethoxy(methyl)silyl]propyl methacrylate, 3-[diethoxy(methyl)silyl]propyl methacrylate, 3-[dichloro(methyl)silyl]propyl methacrylate, [methoxy(dimethyl)silyl]propyl methacrylate, 3-[ethoxy(dimethyl)silyl] propyl methacrylate, 3-[chloro(dimethyl)silyl]propyl methacrylate, 3-(trimethoxysilyl)propyl acrylate, 3-(dimethoxymethylsilyl)propyl acrylate, and/or their mixtures thereof. The at least one organosilane coupling agent comprising an acrylate moiety may be present in an amount of 0.01 to 4 wt %, 0.05 to 4 wt %, 0.1 to 4 wt %, 0.5 to 4 wt %, 1 to 4 wt %, 2 to 4 wt %, 3 to 4 wt %, 0.01 to 3 wt %, 0.05 to 3 wt %, 0.1 to 3 wt %, 0.5 to 3 wt %, 1 to 3 wt %, 2 to 3 wt %, 0.01 to 2 wt %, 0.05 to 2 wt %, 0.1 to 2 wt %, 0.5 to 2 wt %, 1 to 2 wt %, 0.01 to 1 wt %, 0.05 to 1 wt %, 0.1 to 1 wt %, 0.5 to 1 wt %, 0.01 to 0.5 wt %, 0.05 to 0.5 wt %, 0.1 to 0.5 wt %, 0.01 to 0.1 wt %, 0.05 to 0.1 wt %, 0.01 to 0.05 wt %, etc., of the silanized-clay suspension. Organosilane coupling agents in these ranges provide for an amount of alkoxy reactive groups to crosslink the clay layers with the polyacrylate, which can then strengthen interfacial bonding between the clay layers and the polyacrylate, and between the clay-polyacrylate composite and a polymer resin.

For the present method, the mixing may be carried out by injecting the at least one organosilane coupling agent comprising an acrylate moiety into the aqueous solution at a rate of 0.1 ml/min to 3 ml/min, 0.1 ml/min to 2 ml/min, 0.1 ml/min to 1 ml/min, 0.1 ml/min to 0.5 ml/min, 0.5 ml/min to 3 ml/min, 0.5 ml/min to 2 ml/min, 0.5 ml/min to 1 ml/min, 1 ml/min to 3 ml/min, 1 ml/min to 2 ml/min, 2 ml/min to 3 ml/min, etc., while under homogenization of 3000 to 20000 rpm, 5000 to 20000 rpm, 10000 to 20000 rpm, 15000 to 20000 rpm, 3000 to 15000 rpm, 5000 to 15000 rpm, 10000 to 15000 rpm, 3000 to 10000 rpm, 5000 to 10000 rpm, 3000 to 5000 rpm, etc. Advantageously, the hydrophobic acrylate monomers may be intercalated between clay sheets through mixing with hydrophilic acrylate monomers by such high speed homogenization.

For the present method, the first acrylate monomer may be a hydrophilic acrylate monomer (e.g. the more soluble acrylate monomer) according to various embodiments. The second acrylate monomer may be a hydrophobic acrylate monomer (e.g. the relatively less soluble acrylate monomer). The advantages of using acrylate monomers of different solubility have been described above and are reiterated below.

In various instances, the hydrophilic acrylate monomer may be added before the second acrylate monomer. For example, hydrophilic HEA as the first acrylate monomer may be added before the second acrylate monomer of hydrophobic EHA. The presence and addition of the hydrophilic acrylate monomer, being the more soluble acrylate monomer, before the hydrophobic acrylate monomers (the relatively less soluble acrylate monomers), helps to (1) stabilize the hydrophobic acrylate monomers in an aqueous suspension, (2) exfoliate the clay which then allows for better penetration of the hydrophobic acrylate monomer between the clay sheets, and (3) improves dispersion/mixing of the clay with the acrylate monomers. The use of monomers of different solubility eliminates the restriction for polyacrylate to be formed from a single acrylate monomer type. Otherwise, the type of polymer resin to be mixed with the resultant clay-polyacrylate composite may be limited.

As described above, the hydrophilic acrylate monomer may comprise a hydroxyl (—OH) group. The hydrophilic acrylate monomer may comprise HEA, HEMA, HPA or HBA. The hydrophobic acrylate monomer may comprise a water-repelling functional group. The hydrophobic acrylate monomer may comprise EA, BA, HA, EHA, OA, DA, LA, ODA or VA. Advantages of using such acrylate monomers have been described above.

In various embodiments, the hydrophilic acrylate monomer contacted may be 10 to 90 wt %, 20 to 90 wt %, 30 to 90 wt %, 40 to 90 wt %, 50 to 90 wt %, 60 to 90 wt %, 70 to 90 wt %, 80 to 90 wt %, 10 to 80 wt %, 20 to 80 wt %, 30 to 80 wt %, 40 to 80 wt %, 50 to 80 wt %, 60 to 80 wt %, 70 to 80 wt %, 10 to 70 wt %, 20 to 70 wt %, 30 to 70 wt %, 40 to 70 wt %, 50 to 70 wt %, 60 to 70 wt %, 10 to 60 wt %, 20 to 60 wt %, 30 to 60 wt %, 40 to 60 wt %, 50 to 60 wt %, 10 to 50 wt %, 20 to 50 wt %, 30 to 50 wt %, 40 to 50 wt %, 10 to 40 wt %, 20 to 40 wt %, 30 to 40 wt %, 10 to 30 wt %, 20 to 30 wt %, 10 to 20 wt %, etc., and wherein the wt % may be based on total weight of the first acrylate monomer and the second acrylate monomer.

In various embodiments, the hydrophobic acrylate monomer contacted may be 10 to 90 wt %, 20 to 90 wt %, 30 to 90 wt %, 40 to 90 wt %, 50 to 90 wt %, 60 to 90 wt %, 70 to 90 wt %, 80 to 90 wt %, 10 to 80 wt %, 20 to 80 wt %, 30 to 80 wt %, 40 to 80 wt %, 50 to 80 wt %, 60 to 80 wt %, 70 to 80 wt %, 10 to 70 wt %, 20 to 70 wt %, 30 to 70 wt %, 40 to 70 wt %, 50 to 70 wt %, 60 to 70 wt %, 10 to 60 wt %, 20 to 60 wt %, 30 to 60 wt %, 40 to 60 wt %, 50 to 60 wt %, 10 to 50 wt %, 20 to 50 wt %, 30 to 50 wt %, 40 to 50 wt %, 10 to 40 wt %, 20 to 40 wt %, 30 to 40 wt %, 10 to 30 wt %, 20 to 30 wt %, 10 to 20 wt %, etc., wherein the wt % is based on total weight of the first acrylate monomer and the second acrylate monomer.

Figure 3:
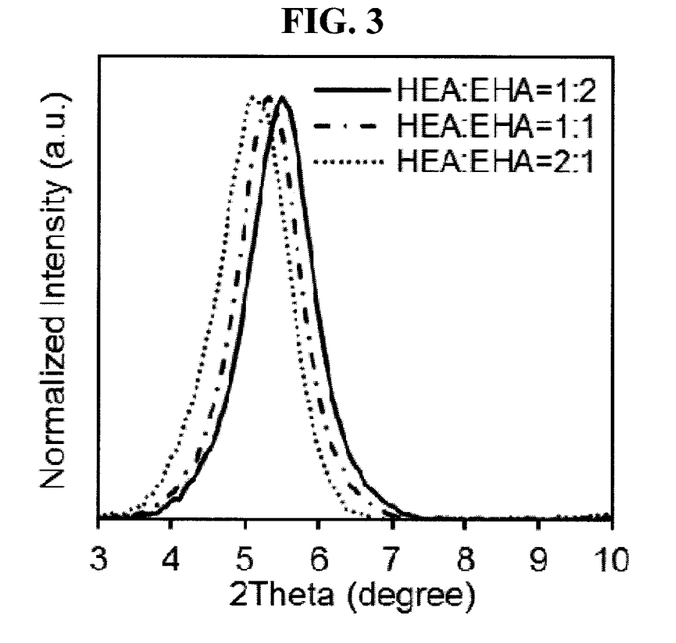
FIG. 3 shows XRD patterns of clay-polyacrylate composites showing increased d-spacing with increasing amounts of HEA.

In various embodiments, the first acrylate monomer and the second acrylate monomer may be contacted at a weight ratio of 1:9 to 9:1. The weight ratio may include 2:9, 3:9, 4:9, 5:9, 6:9, 7:9, 8:9, 1:1, 9:2, 9:3, 9:4, 9:5, 9:6, 9:7, 9:8, etc. In some embodiments, the first acrylate monomer and the second acrylate monomer may be contacted at a weight ratio of 1:2, 1:1 or 2:1. In some embodiments, the weight ratio of HEA to EHA may be 1:2, 1:1 or 2:1, and the X-ray diffraction pattern of these ratios are shown in FIG. 3. The d-spacing of clay layers increases with increasing amount of HEA, demonstrating that HEA helps clay exfoliation and dispersion in polymers. Such ratios are advantageous for tuning the clay-polyacrylate bonding, better exfoliation of the clay and better dispersion of the clay in polymers.

In the present method, the contacting step may be carried out in an inert environment to eliminate oxygen that tends to scavenge for free radicals, which may in turn unnecessarily terminate polymerization. The inert environment may be comprised of argon or nitrogen.

In various embodiments, the contacting step may be carried out by adding the first acrylate monomer and then the second acrylate monomer to the silanized-clay suspension. Advantage(s) of this sequence has been described above.

In the present method, the polymerization initiator may be a positively charged initiator. Advantageously, such an initiator helps to form an intercalated polyacrylate that is covalently bonded to the clay. The polymerization initiator may comprise a redox reagent, peroxide, azo compound and/or their mixtures thereof. In various embodiments, the polymerization initiator may be selected from the group consisting of tert-butyl hydroperoxide (TBHP) with isoascorbic acid, benzoyl peroxide (BPO), azobisisobutyronitrile (AIBN), and 2,2'-azobis(2-methylpropionamidine) dihydrochloride (AIBA). In some embodiments, AIBA, a water-soluble radical initiator as shown below, may be used as the polymerization initiator.

2,2'-Azobis(2-Methylpropionamidine) Dihydrochloride (AIBA)

In various embodiments, the polymerization initiator added may be 0.01 to 1 mol %, 0.05 to 1 mol %, 0.1 to 1 mol %, 0.5 to 1 mol %, 0.01 to 0.5 mol %, 0.05 to 0.5 mol %, 0.1 to 0.5 mol %, 0.01 to 1 mol %, 0.05 to 1 mol %, 0.01 to 0.05 mol %, etc., and wherein the mol % may be based on total mole of the first acrylate monomer and second acrylate monomer contacted. These ranges are advantageous for controlling properties of the resultant composite, such as molecular weight, viscosity, etc.

The present method may further comprise a step of heating after adding the polymerization initiator. The heating may be carried out in the range of 50° C. to 100° C., depending on the decomposition rate of the initiators.

The present disclosure further provides for a method of synthesizing a polymeric clay composition for coating, comprising the steps of: producing a clay-polyacrylate composite according to embodiments as described above, and mixing the clay-polyacrylate composite with a solution comprising a polymer to form the polymeric clay composition, wherein the polymer is miscible with the polyacrylate of the clay-polyacrylate composite.

The term "miscible" as used herein means that two or more substances, when mixed together, do not remain as separate phases. In this instance, the polymer and the polyacrylate do not remain as separate phases but interact with each other. This method is one example of an application of both the present clay-polyacrylate composite and earlier described method of synthesizing the present clay-polyacrylate composite.

Various embodiments of the present clay-polyacrylate composite and the earlier described method of synthesizing the present clay-polyacrylate composite, and advantages associated with various embodiments of the present clay-polyacrylate composite and the earlier described method of synthesizing the present clay-polyacrylate composite, as described above, may be applicable to the present method of synthesizing a polymeric clay composition for coating, and vice versa.

In various embodiments, wherein the clay-polyacrylate composite may be in the form of a suspension. This allows it to be conveniently applied when it is used for coating.

In various embodiments, the polymer may comprise 0.5 to 40 wt %, 1 to 40 wt %, 5 to 40 wt %, 10 to 40 wt %, 15 to 40 wt %, 20 to 40 wt %, 25 to 40 wt %, 30 to 40 wt %, 35 to 40 wt %, 0.5 to 35 wt %, 1 to 35 wt %, 5 to 35 wt %, 10 to 35 wt %, 15 to 35 wt %, 20 to 35 wt %, 25 to 35 wt %, 30 to 35 wt %, 0.5 to 30 wt %, 1 to 30 wt %, 5 to 30 wt %, 10 to 30 wt %, 15 to 30 wt %, 20 to 30 wt %, 25 to 30 wt %, 0.5 to 25 wt %, 1 to 25 wt %, 5 to 25 wt %, 10 to 25 wt %, 15 to 25 wt %, 20 to 25 wt %, 0.5 to 20 wt %, 1 to 20 wt %, 5 to 20 wt %, 10 to 20 wt %, 15 to 20 wt %, 0.5 to 15 wt %, 1 to 15 wt %, 5 to 15 wt %, 10 to 15 wt %, 0.5 to 10 wt %, 1 to 10 wt %, 5 to 10 wt %, 0.5 to 5 wt %, 1 to 5 wt %, 0.5 to 1 wt %, etc., and wherein the wt % may be based on the polymeric clay composition. These ranges are advantageous in that they ensure a viscosity such that the polymeric clay composition is suitable for coating.

In various embodiments, the mixing step may be carried out under 900 rpm for up to 5, 10, 15 minutes, etc.

In the present method, the mixing step may further comprise homogenization at 10000 rpm for up to 1, 2, 2.5 minutes, etc.

In some embodiments, the polymer may comprise, for example, polyvinylidene chloride.

In summary, the present disclosure relates to a method of fabricating intercalated clay-polyacrylate suspension via in situ suspension polymerization without using any surfactant. In the present method, hydrophobic acrylate monomer may be intercalated between clay sheets through mixing with hydrophilic acrylate monomer under high speed homogenization. A plate-like clay sheet is thus modified by intercalating organosilane coupling agent containing acrylate group between clay sheets, which may be carried out by injecting the organosilane coupling agent slowly into clay suspension under high speed homogenization. The present method may involve a positively charged initiator anchored onto clay sheets to initiate polymerization from the clay sheet surface. The strong interfacial bonding strength between clay sheets and polyacrylate is due to the covalent bonding between clay sheets and polyacrylate.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure provides for a method of preparing intercalated clay-polyacrylate suspension without using any surfactant, via in situ polymerization.

The present disclosure also provides for an intercalated clay-polyacrylate composite and fabrication of such an intercalated clay-polyacrylate composite. The composite may be in the form of a suspension. The clay-polyacrylate composite is advantageous in that there is strong interfacial bonding between the clay sheets and polyacrylate, and this can be obtained via in situ suspension polymerization without using any surfactant nor emulsifier. Hydrophobic acrylate monomer may be intercalated between clay sheets by mixing with hydrophilic acrylate monomer through high speed homogenization. To enhance the bonding strength between polyacrylate and clay sheets, the clay sheets are modified by using one or more organosilane coupling agents containing an acrylate group, and polymerization is initiated by using an initiator with positive charge, the polyacrylate then grows from the clay sheet surface and is covalently bonded to the clay sheets. Specifically, as a non-limiting example, the method involves clay dispersed into water and modified by injecting 3-(trimethoxysilyl)propyl methacrylate into the clay suspension under high speed homogenization. Then, hydroxyethyl acrylate (HEA) and ethylhexyl acrylate (EHA) may be injected into the clay suspension under high speed homogenization. After bubbling with inert gas, such as argon (Ar) and nitrogen ($N_2$), for 20 minutes, a polymerization initiator of 2,2'-azobis(2-methylpropionamidine) dihydrochloride (AIBA) may be injected into the solution. In the inert gas environment, a uniform clay-polyacrylate suspension is produced.

The present disclosure also provides for a method of synthesizing a polymeric clay composition for coating based on the earlier described method of synthesizing the clay-polyacrylate composite and the present clay-polyacrylate composite.

The present clay-polyacrylate composite and present methods, and applications of the present clay-polyacrylate composite, are described, by way of further non-limiting examples, as set forth below.

Example 1: General Synthesis of Present Clay-Polyacrylate Composite

The present example describes one embodiment of the present method of synthesizing the present clay-polyacrylate composite. In this exemplified embodiment, an in situ suspension polymerization method for producing a clay-polyacrylate composite suspension is also provided.

The polyacrylate includes both hydrophilic and hydrophobic acrylate blocks. The acrylate copolymer was synthesized from a mixture of hydrophilic and hydrophobic acrylate monomers through suspension polymerization in the presence of clay. The hydrophilic acrylate monomer was selected from a group consisting of a hydroxyl functional group, such as hydroxyethyl acrylate (HEA) and hydroxyethyl methyl acrylate (HEMA). The hydrophobic acrylate monomer was selected from a group consisting of a hydrocarbon functional group, such as vinyl acetate (VA) and ethylhexyl acrylate (EHA).

In the suspension copolymerization, the amount of acrylate monomers may be in the range of 20 to 200 wt %, 30 to 90 wt %, or 50 to 90 wt %, based on the weight of clay. Among the acrylate monomers, weight percentage of the hydrophobic acrylate monomers could be 50 to 80 wt % and the hydrophilic acrylate monomers could be 20 to 50 wt %, wherein the wt % is based on weight of clay.

Figure 1A:
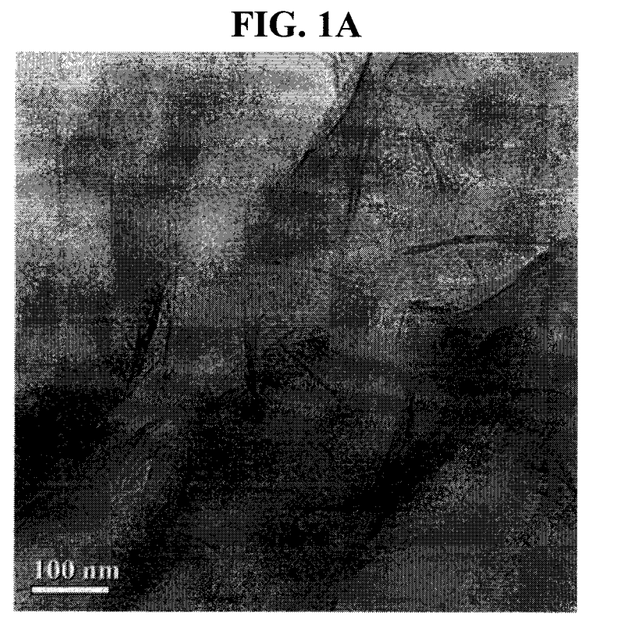
FIG. 1A shows a transmission electron microscopy (TEM) image of a clay-polyacrylate composite comprising intercalated clay sheets of silane modified montmorillonite/poly(2-ethylhexyl acrylate) (SMMT/PEHA) prepared by suspension polymerization according to one embodiment described herein. The scale bar represents 100 nm.
Figure 1B:
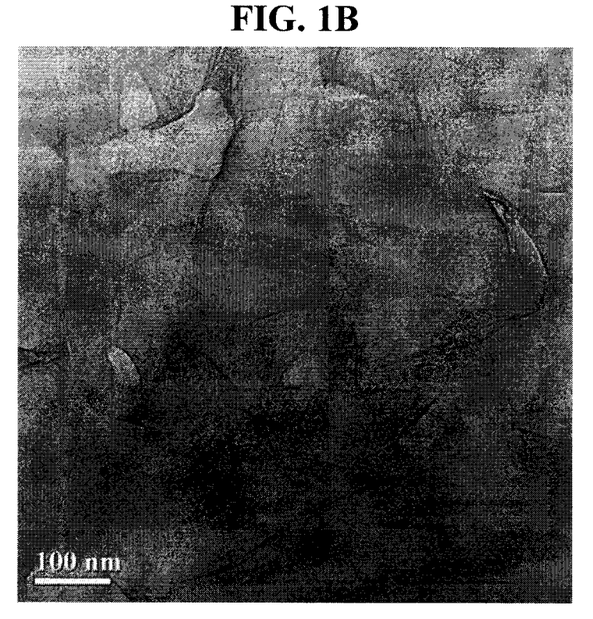
FIG. 1B shows a transmission electron microscopy (TEM) image of a clay-polyacrylate composite comprising exfoliated clay sheets of silane modified montmorillonite/poly(hydroxyethyl acrylate-ran-ethylhexyl acrylate) (SMMT/PHEA-PEHA) prepared by suspension polymerization according to one embodiment described herein. The scale bar represents 100 nm.
Figure 1C:
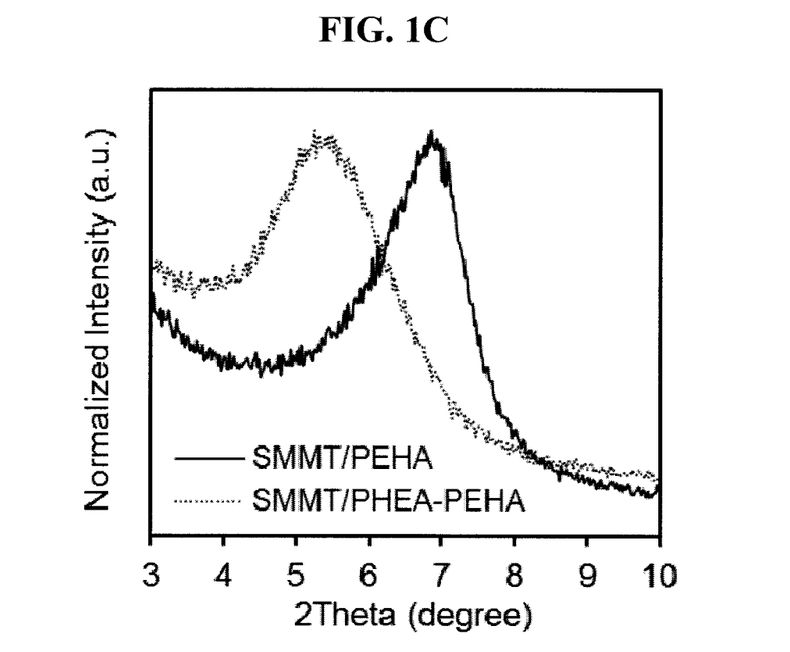
FIG. 1C shows X-ray diffraction (XRD) patterns of clay-polyacrylate composites showing increased d-spacing in the presence of PHEA according to one embodiment described herein.
Figure 1D:
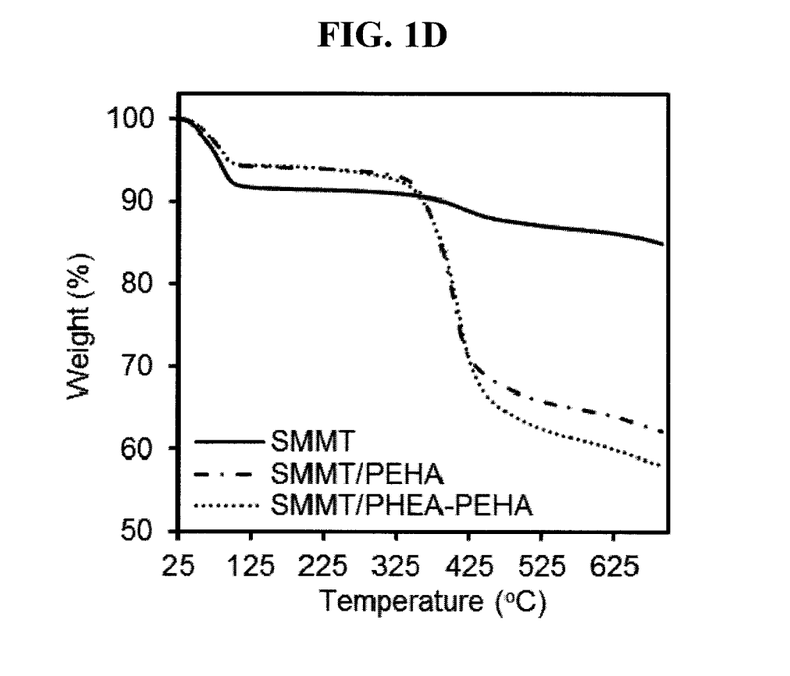
FIG. 1D shows the thermogravimetric analysis (TGA) profiles of clay-polyacrylate showing increased polymerization yield in the presence of PHEA.

In this example, acrylate copolymer was synthesized from a mixture of acrylate HEA and EHA monomers through suspension copolymerization. Hydrophilic HEA was selected for its compatibility with the surface chemistry of the silane-modified clay surface and helps to facilitate more effective PHEA/clay bonding. It also helps in clay exfoliation and clay dispersion in polymers as observed from the transmission electron microscopy (TEM) images (FIGS. 1A and 1B) and X-ray diffraction (XRD) plot (FIG. 1C). The hydrophilic HEA helps to stabilize hydrophobic acrylate monomer, such as EHA, in suspension polymerization and facilitates its polymerization and binding to clay sheets (FIG. 1D). This is demonstrated by TGA profiles where polymerization yield increases from about 80% (SMMT/PEHA) to about 100% (SMMT/PHEA-PEHA).

In this example, the polymerization initiator was selected from (i) peroxide and azo compounds, such as benzoyl peroxide (BPO), azobisisobutyronitrile (AIBN) and 2,2'-azobis(2-methylpropionamidine) dihydrochloride (AIBA), or (ii) redox system, such as tertiary butyl hydroperoxide (TBHP) with isoascorbic acid.

The polymerization was initiated by heating the monomer suspension in the presence of inert gas.

In this example, it is demonstrated that the present method provides a facile route for producing a silane modified polymeric clay composite coating solution. The coating solution comprises of a mixture of clay silicate sheets that were chemically coupled to the polyacrylate by a mixture of organosilane coupling agents.

The clay silicates were selected from a group consisting of montmorillonite, bentonite, laponite, kaolinite, saponite, vermiculite and mixtures thereof. The clay may be natural clay, synthetic clay or silane(s) modified clay. In one instance, the clay used was montmorillonite. It is to be appreciated that any clay with a plate-like structure and high aspect ratio may be used.

In one instance, the clay was dispersed in aqueous solution. A small volume of acetic acid was added to promote exfoliation of clay sheets in the suspension. The clay may then be hydrothermally heated to a temperature at or below 120° C. For one instance, the aqueous clay suspension was hydrothermally heated at 120° C. for 1 to 3 hours. The hydrothermal heating process may stabilize clay dispersion in water by modifying clay surface with more hydroxyl groups.

In one instance, the clay was chemically coupled to the polyacrylate by a silane coupling agent or mixtures thereof. The silane coupling agent was 3-(trimethoxysilyl)propyl methacrylate. Other methacrylate-based organosilanes are useable. The amount of silane coupling agent may be in the range of 2 to 20 wt % or 5 to 10 wt %, based on the weight of clay.

In various instances, the silane was introduced to the dispersed clay suspension via slow injection technique while the clay suspension was continuously mixed under a high speed of homogenization process. It is to be appreciated that the speed of injection may be from 0.1 to 3.0 ml/min, 0.1 to 1.0 ml/min, or 0.1-0.5 ml/min. The homogenization speed may be 15,000 to 20,000 rpm.

The silane coupling agent helps to improve the clay dispersion into polymer. It may strengthen the bonding by crosslinking a polyacrylate to the clay silicate via alkoxy reactive groups of the silane, and initiating the acrylate reactive group of the silane (working as a "comonomer") for polymerization. The polymer chains were then tethered to the silicate layers and prevented aggregation of the silicate sheets to help preserve the exfoliated structure. This allowed for better penetration of polymer resin into the intercalated clay for improved interaction between the clay-polyacrylate composite and the polymer resin.

The resultant intercalated clay-polyacrylate composite suspension was then mixed with polyvinylidene chloride (PVDC) suspension at high speed stirring to produce a clay/PVDC high barrier coating suspension with clay content of about 30 wt %. The coating suspension was applied onto a polyethylene terephthalate (PET) film and dried at 50° C. for 48 hours. The oxygen transmission rate of the coated PET film was measured by using Mocon tester, which was as low as 0.3 $cc/m^2/24$ hours.

In general, the intercalated clay composite, for example, in the form of a suspension, may comprise: (a) 1.0 to 10.0 wt % of clay, (b) 0.05 to 1.0 wt % of silanes, (c) 0.1 to 10.0 wt % of poly(acrylic acid), (d) 1.0 to 15.0 wt % of PVDC, and (e) 98 to 64 wt % of deionised water or 98 to 64 wt % of an aqueous mixture with 25 wt % of 2-propanol.

Further examples of the present clay-polyacrylate composite and the present method are described below.

Example 2: Preparation of Hydrothermally Treated Clay Suspension (HTMMT)

10.0 g of pristine clay (montmorillonite) obtained from Nanocor Inc. of Arlington Heights of Illinois of the United States of America was mixed with 250 ml of deionised water and stirred for 6 hours, followed by ultrasonication in a water-bath for 30 minutes. Then, 0.375 ml of acetic acid was added to the solution and stirred for another 12 hours. The clay suspension was homogenized using IKA T18 Basic Ultra Turrax homogenizer at 15,000 rpm for 15 minutes. Afterwards, the clay suspension was transferred to hydrothermal cells and subjected to hydrothermal treatment for 3 hours at 120° C.

Example 3: Preparation of Silanes Modified Clay Suspension (SMMT)

100 g of HTMMT obtained from example 2 was first homogenized using IKA T18 Basic Ultra Turrax homogenizer at 15,000 rpm for 5 minutes. 0.4 g of 3-(trimethoxysilyl)propyl methacrylate (10 wt % based on clay) was then slowly injected (0.1 ml/min) into the clay suspension, under high speed of homogenizing process at 15,000 rpm. The silane modified clay suspension was further homogenized at 15,000 rpm for another 5 minutes.

Example 4: Preparation of SMMT/PEHA Composite Suspension Via In Situ Polymerization 100 g of HTMMT obtained from example 2 was first added in a 500 ml round bottom flask. 0.4 g of 3-(trimethoxysilyl)propyl methacrylate was then slowly injected (0.1 ml/min) into the clay suspension. After that, 100 ml of deionised water was added into the silane modified clay suspension. A mixture of 15.2 mg of AIBA (0.9 mol %, based on monomers) and 0.323 ml of deionised water was added to the suspension. 1.2 g of ethylhexyl acrylate (EHA) was added (30 wt % based on clay). The above processing was all under homogenization using IKA T18 Basic Ultra Turrax homogenizer at 15,000 rpm and inletting $N_2$. The suspension was then heated to 100° C. with vigorous mechanical stirring and inletting $N_2$ for overnight. The total solid concentration of the prepared SMMT/PEHA composite suspension was 2.8 wt %.

Example 5: Preparation of SMMT/PHEA-PEHA Composite Suspension Via In Situ Polymerization 100 g of HTMMT obtained from example 2 was first added in a 500 ml round bottom flask. 0.4 g of 3-(trimethoxysilyl) propyl methacrylate was then slowly injected (0.1 ml/min) into the clay suspension. After that, 100 ml of deionised water was added into the silane modified clay suspension. A mixture of 32.5 mg of AIBA (0.9 mol %, based on monomers) and 0.691 ml of deionised water was added to the suspension. 0.773 g of hydroxyethyl acrylate (HEA) and 1.227 g of ethylhexyl acrylate (EHA) were added in order (monomer molar ratio 1:1; 50 wt % based on clay). The above processing was all under homogenization using IKA T18 Basic Ultra Turrax homogenizer at 15,000 rpm and inletting $N_2$. The suspension was then heated to 100° C. with vigorous mechanical stirring and inletting $N_2$ for overnight. The total solid concentration of the prepared SMMT/PEHA-PHEA composite suspension was 3.2 wt %.

Example 6: Preparation of SMMT/Polymer Composite Suspension Via In Situ Polymerization The preparation method was similar to example 5, except varying the monomer type, monomer molar ratio, initiator to monomer molar ratio, clay to polymer ratio (wt %) and final total solid content. Such variations and/or their ranges have been described above.

Example 7: Preparation of SMMT/PVDC Composite Coating Suspension 50 g of SMMT/PEHA obtained from example 4 was first added in a beaker and stirred at low speed using an overhead stirrer. 4.86 g of PVDC solution was then added dropwise into the SMMT/PEHA while stirring. The mixture was further stirred at high speed of 900 rpm for 15 mins. The total solid concentration of the prepared suspension is 6.8 wt %. SMMT/PHEA-PEHA from example 5 was also useable instead of SMMT/PEHA.

Example 8: Preparation of SMMT/PVDC Composite Coating Suspension 50 g of SMMT/PEHA obtained from example 4 was first added in a beaker and stirred at low speed using an overhead stirrer. 4.861 g of PVDC solution was then added dropwise into the SMMT/PEHA while stirring. The mixture was further stirred at high speed of 900 rpm for 15 mins and further homogenized using the IKA T18 Basic Ultra Turrax homogenizer at 10,000 rpm for 2.5 mins. The total solid concentration of the prepared suspension is 6.8 wt %. SMMT/PHEA-PEHA from example 5 was also useable instead of SMMT/PEHA.

Example 9: Barrier Coating Properties

As described above, the present method and present clay-polyacrylate composite can be used for forming a coating. The coating may be a barrier coating. The barrier coating contents were analyzed and the oxygen transmission rate (OTR) was characterized.

The general preparation method of the clay-polyacrylate barrier coating has been described above in examples 7 and 8.

OTR was measured by using Mocon oxygen permeability OX-TRAN Model 2/21 according to ASTM D3985. Each coating was placed on a stainless steel mask with an open testing area of 5 cm$^2$. Oxygen permeability measurements were conducted at 23° C. (1 atm, i.e. 101.325 kPa) and 0% relative humidity by placing coated barrier layer to the oxygen rich side.

The preparation is straightforward and is a sustainably green process where no organic solvents nor surfactants are needed. The suspension is stable and the coated barrier layer performance is at least comparable to conventional clay barrier coating. Table 1 below summarizes the results of 3 different samples made from the method as described herein. The wt % indicated in table 1 is based on the dry clay. The solid content in suspension includes clay, organosilane, PEHA and PVDC. The results demonstrate that the barrier coating is reproducible.

TABLE 1

Contents of Barrier Coating and its Optical transmittance

| Sample No. | Type of Film | Silane (wt %) | Polyacrylate (wt %) | PVDC (wt %) | Solid Content in Suspension (wt %) | OTR (cc/m$^2$/24 hr) |
|---|---|---|---|---|---|---|
| 1 | SMMT/PEHA/PVDC | 10 | 30 | 233 | 6.8 | 0.57 |
| 2 | SMMT/PEHA/PVDC | 10 | 30 | 233 | 6.8 | 0.74 |
| 3 | SMMT/PEHA/PVDC | 10 | 30 | 233 | 6.8 | 0.51 |

Example 10: Commercial/Potential Applications

The present method provides for an approach to intercalate acrylate monomers between clay sheets without the need to develop any surfactant. The intercalated acrylate monomers were further initiated to produce polyacrylate covalently bonded to clay sheet through surface modification of clay sheets with silane containing acrylate groups, and anchoring positively charged initiators onto the clay sheets. The resulting polyacrylate/clay suspension may be further formulated with PVDC to produce high barrier coating.

The present clay-polyacrylate composite, the present method and the present polymeric clay composition derived from the present clay-polyacrylate composite and present method, may be used for food and beverage packaging, in developing paints, coatings, sealants and adhesives. They may also find applications in plastic and converter industries.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A clay-polyacrylate composite comprising:
   one or more layers of clay intercalated with polyacrylate;
   wherein the one or more layers of clay comprises at least one organosilane coupling agent comprising an acrylate moiety;
   wherein the at least one organosilane coupling agent is attached to a surface of the one or more layers of clay and the polyacrylate is covalently attached to the organosilane coupling agent; and
   wherein the polyacrylate consists of a first acrylate monomer and a second acrylate monomer having different solubility, wherein the first acrylate monomer is a hydrophilic acrylate monomer comprising a hydroxyl (—OH) group and the second acrylate monomer is a hydrophobic acrylate monomer which repels water.

2. The clay-polyacrylate composite according to claim 1, wherein the at least one organosilane coupling agent comprising an acrylate moiety comprises 3-(trimethoxysilyl) propyl methacrylate, 3-(triethoxysilyl)propyl methacrylate, 3-(trichlorosilyl)propyl methacrylate, 3-[dimethoxy(methyl)silyl]propyl methacrylate, 3-[diethoxy(methyl)silyl]propyl methacryl ate, 3-[dichloro(methyl)silyl]propyl methacryl ate, 3-[methoxy(dimethyl)silyl]propyl methacrylate, 3-[ethoxy(dimethyl)silyl]propyl methacrylate, 3-[chloro(dimethyl)silyl]propyl methacrylate, 3-(trimethoxysilyl)propyl acrylate, 3-(dimethoxymethyl silyl)propyl acrylate, and/or their mixtures thereof.

3. The clay-polyacrylate composite according to claim 1, wherein the hydrophilic acrylate monomer comprises 2-hydroxyethyl acrylate (HEA), 2-hydroxyethyl methylacrylate (HEMA), hydroxypropyl acrylate (HPA), or 4-hydroxybutyl acrylate (HBA).

4. The clay-polyacrylate composite according to claim 1, wherein the hydrophilic acrylate monomer is present in the polyacrylate in an amount of 10 to 90 wt %, and wherein the wt % is based on weight of the polyacrylate.

5. The clay-polyacrylate composite according to claim 1, wherein the hydrophobic acrylate monomer comprises ethyl acrylate (EA), butyl acrylate (BA), hexyl acrylate (HA), 2-ethylhexyl acrylate (EHA), octyl acrylate (OA), decyl acrylate (DA), lauryl acrylate (LA), octadecyl acrylate (ODA), or vinyl acetate (VA).

6. The clay-polyacrylate composite according to claim 1, wherein the hydrophobic acrylate monomer is present in the polyacrylate in an amount of 10 to 90 wt %, and wherein the wt % is based on weight of the polyacrylate.

7. A method of synthesizing a polymeric clay composition for coating, comprising the steps of:
   (i) producing a clay-polyacrylate composite comprising:
      one or more layers of clay intercalated with polyacrylate;
      wherein the one or more layers of clay comprises at least one organosilane coupling agent comprising an acrylate moiety;
      wherein the at least one organosilane coupling agent is attached to a surface of the one or more layers of clay and the polyacrylate is covalently attached to the organosilane coupling agent; and
      wherein the polyacrylate consists of a first acrylate monomer and a second acrylate monomer having different solubility, wherein the first acrylate monomer is a hydrophilic acrylate monomer comprising a hydroxyl (—OH) group and the second acrylate monomer is a hydrophobic acrylate monomer which repels water; and
   (ii) mixing the clay-polyacrylate composite with a solution comprising a polymer to form the polymeric clay composition, wherein the polymer is miscible with the polyacrylate of the clay-polyacrylate composite.

* * * * *